Patented Aug. 25, 1942

2,293,760

UNITED STATES PATENT OFFICE 2,293,760

POLYAMIDE SOLUTION

Franklin Traviss Peters, Wilmington, Del., assignor to E. I. du Pont de Nemours & Company, Wilmington, Del., a corporation of Delaware No Drawing. Application July 6, 1939, Serial No. 283,124

4 Claims. (Cl. 260—32)

This invention relates to compositions of matter, and more particularly to new and useful fluid compositions comprising synthetic linear polymers.

The synthetic linear polymers with which this invention is concerned are polyamides of the types described in U. S. Patents 2,071,250, 2,071,253, and 2,130,948. It is therefore to be understood that the expression "synthetic linear polyamides," as used hereinafter, designates the said general types. A characteristic property of these polyamides is that they can be formed into filaments which can be cold drawn into fibers showing molecular orientation along the fiber axis. These polyamides are especially useful for the preparation of fibers, bristles, ribbons, sheets, foils, and coatings on metal, paper, fabric, regenerated cellulose, and the like. The polyamides are of two types, those derived from polymerizable monoaminomonocarboxylic acids or their amide-forming derivatives, and those derived from the reaction of suitable diamines with suitable dicarboxylic acids or amide-forming derivatives of dibasic carboxylic acids. It will be noted that the polyamides are derived from bifunctional amide-forming reactants. On hydrolysis with mineral acids, the polyamides yield monomeric amide-forming reactants. For example, a polyamide derived from a diamine and a dibasic acid yields on hydrolysis with hydrochloric acid the dibasic acid and the diamine hydrochloride. Similarly an amino-acid type polyamide yields an amino-acid hydrochloride.

Although the synthetic linear polyamides as a class are microcrystalline and have fairly high and sharp melting points, they can be formed into many useful objects without the use of solvents. This is accomplished by spinning, extruding, or otherwise forming the object from the molten polyamide. However, there are advantages in the use of solutions rather than molten compositions to achieve the fluid state necessary in lacquers, coating compositions, and dopes suitable for use in forming various objects, such as films, sheets, ribbons, bristles, and filaments. For example, in coating fabrics, paper, or other materials which are charred or tendered by high temperatures, the use of a solution which can be applied and subsequently evaporated to dryness at a relatively low temperature does not cause deterioration of the material being coated. It is often desirable to prepare a fluid composition for use over a period of time, and in that event it is convenient if the composition can be kept in the liquid state by storage at ordinary temperatures. The application of such solutions as lacquers or adhesives is much more easily carried out by methods well known to the art than is the application of a molten composition. Further, the incorporation of plasticizers or other modifying agents into polyamides is more advantageously done by addition of the plasticizer to a solution of the polyamide rather than to a molten polyamide, minimizing the tendency toward discoloration and decomposition which frequently occurs when blending is done with a melt. Further, there is a tendency with certain types of plasticizers and modifying agents to be less compatible at the high temperatures required for blending in a melt, whereas they can be readily incorporated in a polyamide solution at a low temperature. A still further advantage in the use of solutions lies in the ease with which they can be cast into films or coatings of uniform thickness, which is mechanically more difficult to accomplish with a molten composition due to its relatively high viscosity.

The fiber-forming polyamides are generally insoluble in the more common organic solvents but are soluble in phenols and usually in certain organic acids, e. g. formic and acetic. These solvents are of limited utility, however, due to their corrosive nature, toxicity, and tendency to degrade the polymers. Further, although films or coatings can be cast from solutions in these solvents, films flowed or cast in accord with the usual procedure for depositing films from film-forming materials are translucent or cloudy and are therefore of limited utility. Among non-acidic organic materials, butanol has been heretofore used with some success as a solvent, but since the solutions generally form gels at temperatures below about 80° C., it is necessary to use the solutions at temperatures above 80° C. Other non-acidic organic materials are less effective solvents than butanol. In contrast to butanol, closely related alcohols show little or no solvent action on the polyamides with which this application is concerned. Chlorinated hydrocarbons also have little or no solvent action on these polymers.

This invention has as an object the preparation of new and improved synthetic linear polyamide compositions useful in making filaments, bristles, ribbons, films, sheets, and coatings on metal, fabric, paper, regenerated cellulose, and the like.

This and other objects which will be apparent from the following description, are accomplished by dissolving the polyamide in a volatile solvent mixture comprising an alcohol and a halogenated hydrocarbon.

I have now found that mixtures of halogenated hydrocarbons with alcohols are very active solvents for the above mentioned polymers and that the resulting solutions can be readily cast into clear films, coated on fabrics, metal, paper, and the like at room temperature or slightly higher temperatures. This solubility with the production of these valuable solutions is surprising in view of the ineffective solvent action of the separate constituents of the solvent mixture. For example, although methanol has no appreciable solvent action on the polyamides with which this invention is most concerned, even at the boiling point, and chloroform is likewise ineffective, mixtures of methanol and chloroform readily dissolve these polyamides, frequently at room temperature and usually at temperatures only slightly above room temperature.

In the practice of this invention a variety of halogenated hydrocarbons and alcohols can be used. The concentration of the polymers which can be obtained in solution and the viscosity of the solution depend upon the nature of the polymer used, the nature of the solvent components, the proportions of the solvent components, and the temperature. This invention is particularly advantageous in connection with the interpolyamides, i. e. polyamides derived from a mixture of polyamide-forming compositions, since solutions of these polymers can be obtained in the highest concentrations. Of the simple polyamides the most soluble are those having hydrocarbon radicals as lateral substituents, as for instance those derived from such diamines as 2,5-dimethylhexamethylene diamine or 2-tertiary butylhexamethylene diamine, or from such acids as $\alpha$-$\alpha'$-dimethyl adipic acid or $\alpha$-tertiary butyl adipic acid.

Among the alcohols which may be used as solvent components, methanol contributes the greatest solvent or dispersing effect, and there is a gradual decrease in the solvent effect contributed by alcohols of increasing molecular weight. Among the halogenated hydrocarbons which may be used as solvent components, chloroform and other compounds which contain a halogenated alkyl group which retains only one hydrogen atom contribute the maximum solvent or dispersing effect. The most desirable combination of solvent components in a given case will depend on the nature of the polymer and, to a certain extent, on the nature of the other ingredients present, such as plasticizers, pigments, and the like. Depending upon the nature of the polymer and the solvent components used, the weight ratio of halogenated hydrocarbons to the alcohols used in admixture as solvents may be conveniently varied between 1:9 and 9:1, the preferred range being from 2:1 to 4:1. The toughness, clarity, and other properties of films, fibers, and other objects formed by evaporation or coagulation of the polyamide solution vary somewhat with the ratios of the solvent components. It is frequently advantageous to use more than one alcohol in admixture with a halogenated hydrocarbon. This is particularly true when certain plasticizers are added to the solution. With some plasticized compositions, clear films or coatings can be obtained from the solutions only when more than one alcohol is present in the solution. Similarly, it is sometimes advantageous to use a plurality of halogenated hydrocarbons in admixture with one or more alcohols. It is also frequently useful to add diluents, which have no tendency to increase the solvent action of the mixture, but may aid in promoting the clarity of objects formed by evaporation of the solvents, or may act as blending agents for the polyamide and plasticizers or other modifying agents. Aromatic hydrocarbons, e. g. benzene and toluene, are examples of diluents which may be used for these compositions.

In most cases the solutions can be conveniently prepared by agitating the polymer with the solvent mixture at room temperature or at a slightly higher temperature, although it is frequently advantageous to agitate the polymer with the solvent at the boiling point of the solvent under a reflux condenser. A given solvent mixture may have only a swelling action on a given polymer at room temperature, forming a rigid or non-fluid gel. A gel of this type can usually be dispersed to a fluid solution by raising the temperature. Solutions prepared in this manner will solidify again to a gel after cooling to room temperature or below the minimum temperature required to effect solution originally. The time interval which elapses before a gel is formed varies with the nature of the polymer, the solvents, plasticizers, and other materials present in the composition. In some cases such supercooled solutions can be handled at room temperature for as long as several days before gel formation occurs. In other cases a gel may be formed within several minutes after cooling to room temperature. When the solutions are used to form films, fibers, coatings, or other objects by a process involving solvent evaporation it is frequently advantageous to cool the solutions to temperatures in the range where gel formation can eventually occur but is sufficiently delayed to permit the casting, coating, or desired manipulation to be carried out while the composition is still fluid, since in this unstable condition the solutions generally have a higher viscosity than at the temperatures where gel formation cannot occur. The increased viscosity is of particular advantage when the solutions are cast or applied as thick coatings or films since a viscous coating will maintain its shape in the time interval required for solvent evaporation to produce a self-supporting coating or film. It is often possible by continued agitation of a super-cooled solution to prevent the formation of a gel at temperatures below which gel formation would otherwise occur, and this procedure can be used to advantage in practicing the present invention.

This invention is described more specifically in the following examples, in which parts are expressed by weight.

*Example I*

One hundred fifty parts of an interpolyamide (intrinsic viscosity 1.29) prepared from hexamethylenediammonium adipate (salt derived from hexamethylenediamine and adipic acid) and caprolactam in the weight ratio of 3 to 2 was dissolved in a mixture of 900 parts of chloroform and 240 parts of methanol by heating and stirring under a reflux condenser. The clear solution thus obtained was stored for 3 days at 50° C., during which time it remained fluid. At various intervals during this storage period portions of the solution were cooled to room temperature and flowed in a uniform layer on a metal casting plate at 20° C. by means of a leveling blade set at 0.0065 in. The casting plate temperature was maintained at 20° C. until the solvents had evaporated sufficiently to give a film which was dry to the touch (about 5 minutes). To dry the film further the plate was heated at 40°-45° C. for 6 minutes and then at 100° C. for 10 minutes with a draft of hot air circulating above the film. The film was then stripped from the casting plate and finally stored in an oven at 65° C. for at least 12 hours to remove traces of solvent. Films 0.00083 in. thick which were cast by this procedure had average tensile strengths (based on the original dimensions) of 7000 lbs. per sq. in. and elongations of 632%, both of which were measured on the standard Scott Tensile Strength machine at 77° F. and 50% relative humidity.

Example II

Five parts of an interpolyamide (intrinsic viscosity 0.82) prepared from hexamethylenediammonium adipate and caprolactam in a weight ratio of 40:60 was agitated with a mixture of 7.5 parts of trichloroethylene and 8 parts of methanol at 40° C. until a clear solution was obtained. After the solution was cooled to room temperature, it was used to impregnate cloth.

Example III

Two hundred parts of an interpolyamide (intrinsic viscosity 1.03) prepared from equimolecular quantities of hexamethylenediammonium adipate and decamethylenediammonium sebacate was stirred at 60° C. for two hours with 240 parts of methanol, 220 parts of trichloroethylene, 100 parts of 2-bis-parahydroxyphenylpropane, and 100 parts of the mixture of N-ethyl para- and ortho-toluenesulfonamides which is commercially known as Santicizer #8. The resulting solution was then mixed at 60° C. with 235 parts of a pigment dispersion consisting of 133 parts of a mixture of solid pigments, 53 parts of methanol, and 49 parts of trichloroethylene. The pigmented solution was then cooled to 40°-45° C. and coated on fabric at this temperature.

Example IV

One part of a polyamide (intrinsic viscosity 0.54) prepared from 2,5-dimethylhexamethylenediamine and α, α'-dimethyl adipic acid was dissolved in a mixture of 6 parts of chloroform and 1.8 parts of methanol by stirring at room temperature. The resulting thin solution was applied with a brush as a clear lacquer over metal, wood, and glass surfaces.

Example V

Ten parts of an interpolymer (intrinsic viscosity 1.07) prepared from equimolecular quantities of hexamethylenediammonium adipate and decamethylenediammonium sebacate was dissolved in 90 parts of chloroform, 24 parts of methanol, and 6.5 parts of n-butanol at 55° C. Copper wire (Brown and Sharpe gauge #20) was drawn at a uniform rate through this solution, which was maintained at 55° C., and then through a zone of air heated to 90° C. so that a tough, adherent, transparent coating 0.0004 in. thick was obtained.

Example VI

An ester-amide interpolymer (intrinsic viscosity 0.80) was prepared from 30 parts of hexamethylenediammonium sebacate and 70 parts of an equimolecular mixture of 2,2-dimethyl propanediol [HOCH$_2$C(CH$_3$)$_2$CH$_2$OH] and sebacic acid. Ten parts of this polymer was dissolved in a mixture of 55 parts of dichloromethane and 16 parts of ethanol by warming to 40° C. After the solution was cooled to 20° C. films were cast by a procedure similar to that described in Example I. When tested on the standard Scott Tensile Strength machine at 77° F. and 50% relative humidity, the films (0.0008 in. thick) had a tensile strength of 2,000 pounds per sq. in. (based on original dimensions) and an elongation of 540%. The interpolymer solution was also suitable for spinning filaments by a dry spinning technique similar to that by which cellulose acetate filaments are spun. Upon cold drawing these interpolymer filaments as described in U. S. Patent 2,071,251, oriented fibers of good tenacity and high elasticity could be obtained.

Further examples of valuable solutions of ester-amide interpolymers for film casting, fabric coating, adhesive uses, etc., are those indicated below:

| Polymer | Solvents (ratio by wt.) | Per cent polymer in solution |
|---|---|---|
| Polyhexamethylene adipamide-polyethylene adipate (85% ester). | Methanol (16) / Trichloroethylene (15) | 40 |
| Polyhexamethylene adipamide-polyethylene adipate (70% ester). | Methanol (8) / Chloroform (15) / n-Butanol (1.6) | 22 |

As examples of additional synthetic linear polymers which can be dissolved in solvent mixtures comprising halogenated hydrocarbons and alcohols, there may be mentioned polyamides derived from the combination of a dibasic acid and a diamine, at least one of which and preferably both of which reactants are substituted with at least one alkyl group in the hydrocarbon chain. Interpolyamides derived from the combination of two or more diamines with two or more dibasic acids are particularly well adapted to the preparation of these solutions. As examples of polyamides of this type which may be used may be mentioned those derived from the combination of any two or more of the following diamines with any two or more of the following dibasic acids:

Tetramethylenediamine
Pentamethylenediamine
Hexamethylenediamine
Octamethylenediamine
Decamethylenediamine
p-Xylylenediamine
m-Phenylenediamine
3,3'-diaminodipropyl ether Adipic acid
Sebacic acid
Suberic acid
Carbonic acid
Azelaic acid The interpolyamides obtainable from a combination of polymerizable monoaminocarboxylic acids or a combination of one or more of polymerizable monoaminomonocarboxylic acids with one or more diamines and one or more dibasic acids are also excellently adapted to the preparation of solutions of the type described in this invention. As examples of polyamides of this type which may be used may be mentioned those derived from the combination of 6-amino-caproic acid, 9-aminononanoic acid, 11-aminoundecanoic acid, or one of their amide-forming derivatives with one or more of the diamines mentioned in the table just preceding and with one or more of the acids mentioned in the same table.

In addition to using the polymers mentioned above which are obtainable from bifunctional polyamide-forming reactants, as essentially sole reactants, the use of linear polymers obtained by including with polyamide-forming reactants other bifunctional reactants, such as glycols and dibasic acids, has been described in Example VI. Although these products contain ester linkages, they can still be referred to as polyamides, since they contain a plurality of amide linkages and retain many of the desirable properties of the simple polyamides. As additional examples of such modified polyamides which can be dissolved in solvent mixtures comprising halogenated hydrocarbons and alcohols, there may be mentioned the interpolymers derived from the combination of hexamethylenediammonium adipate with ethylene glycol and sebacic acid, hexamethylenediammonium adipate with diethylene glycol and adipic acid, hexamethylenediammonium adipate with dimethyl dimethylolmethane and adipic acid, hexamethylenediammonium sebacate with ethylene glycol and sebacic acid, and decamethylenediammonium sebacate with ethylene glycol and sebacic acid. Further examples of modified polyamides to which the present invention is applicable are those derived from amino acids, dibasic acids, and glycols; those derived from amino acids and hydroxy acids; and those derived from diamines, dibasic acids and hydroxy acids. The invention is also applicable to mixtures of polyamides. In general, the synthetic linear polymers do not possess fiber-forming properties unless they have an intrinsic viscosity above 0.4. Therefore, to be useful in making fibers or likewise in making films, ribbons, tough coatings, etc., the polyamide should have an intrinsic viscosity above 0.4 and preferably above 0.6. The expression, intrinsic viscosity, is to be understood in accordance with the definition thereof contained in U. S. Patent 2,130,948.

As additional examples of halogenated hydrocarbons which may be used in admixture with one or more alcohols to prepare polyamide solutions may be mentioned carbon tetrachloride, 1,2-dichloroethane, ethylidene dichloride, symmetrical dichloroethylene, unsymmetrical dichloroethylene, 1-dichloro-2-chloroethane, 1-trichloroethane, tetrachloroethane, tetrachloroethylene, and chlorobenzene. Chlorinated ethers, such as β,β'-dichloroethyl ether, may also be used. Although the chlorinated hydrocarbons are in general preferred, other halogenated hydrocarbons may be used, suitable examples being ethylene dibromide, bromoform, and fluorobenzene.

As additional examples of alcohols which may be used in admixture with one or more halogenated hydrocarbons to prepare polyamide solutions may be mentioned n-propanol, isopropanol, isobutanol, tertiary butanol, the various amyl alcohols, and benzyl alcohol. The preferred alcohols contain less than five carbon atoms. Ether alcohols, such as β-methoxyethanol, may be used. Keto alcohols, such as diacetone alcohol, are also useful. Polyhydric alcohols, e. g. ethylene glycol, can be used but are less preferred because of their high boiling points.

The properties of objects formed from the compositions described herein may be modified and are frequently rendered more useful by the addition of plasticizers and pigments. The compositions of this invention may also contain other types of modifying agents, such as resins, cellulose derivatives, and other film-forming materials, waxes, water-repellents, luster modifying agents, dyes, antioxidants, oils, antiseptics, etc.

The present solutions of polyamides in mixtures of volatile halogented hydrocarbons and volatile alcohols are useful for forming a variety of objects by a process of solvent evaporation. Typical objects which can be formed from these solutions by solvent evaporation are fibers, filaments, bristles, surgical sutures, fishing leaders, fishline, dental floss, films, ribbons, sheets, safety glass interlayers, golf ball covers, and plasticized or otherwise modified solid compositions useful in making molded articles. The solutions are useful for application as lacquers on wood, metal, glass, and other surfaces, for coating wire, fabrics, paper, regenerated cellulose, and the like, and for impregnating fabric, paper, etc.

The advantages which these solutions possess over synthetic linear polyamide solutions previously proposed in the art that they are substantially non-corrosive, are fluid at relatively low temperatures, and can be evaporated at relatively low temperatures, giving transparent, homogeneous films, fibers, and other objects. Moreover, the solvent mixtures of this invention do not materially degrade the polyamides even during storage for long periods of time, although there is some evidence of reaction when the solutions are heated.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a solution of synthetic linear polyamide in a solvent mixture comprising, in 1:9–9:1 weight ratio range, alcohol and halogenated hydrocarbon; the said polyamide being the reaction product of a polymer-forming composition comprising a diamine, a dibasic carboxylic acid and a monoaminomonocarboxylic acid.

2. The composition set forth in claim 1 in which the said halogented hydrocarbon is a chlorinated hydrocarbon.

3. The composition set forth in claim 1 in which the said solvent mixture comprises trichroroethylene and methanol.

4. A composition of matter comprising a solution of synthetic linear polyamide in a solvent mixture comprising, in 1:9–9:1 weight ratio range, alcohol and halogented hydrocarbon, the said polyamide being the reaction product of a polymer-forming composition comprising hexamethylenediammonium adipate and caprolactam.

FRANKLIN TRAVISS PETERS.